Patented Oct. 10, 1939

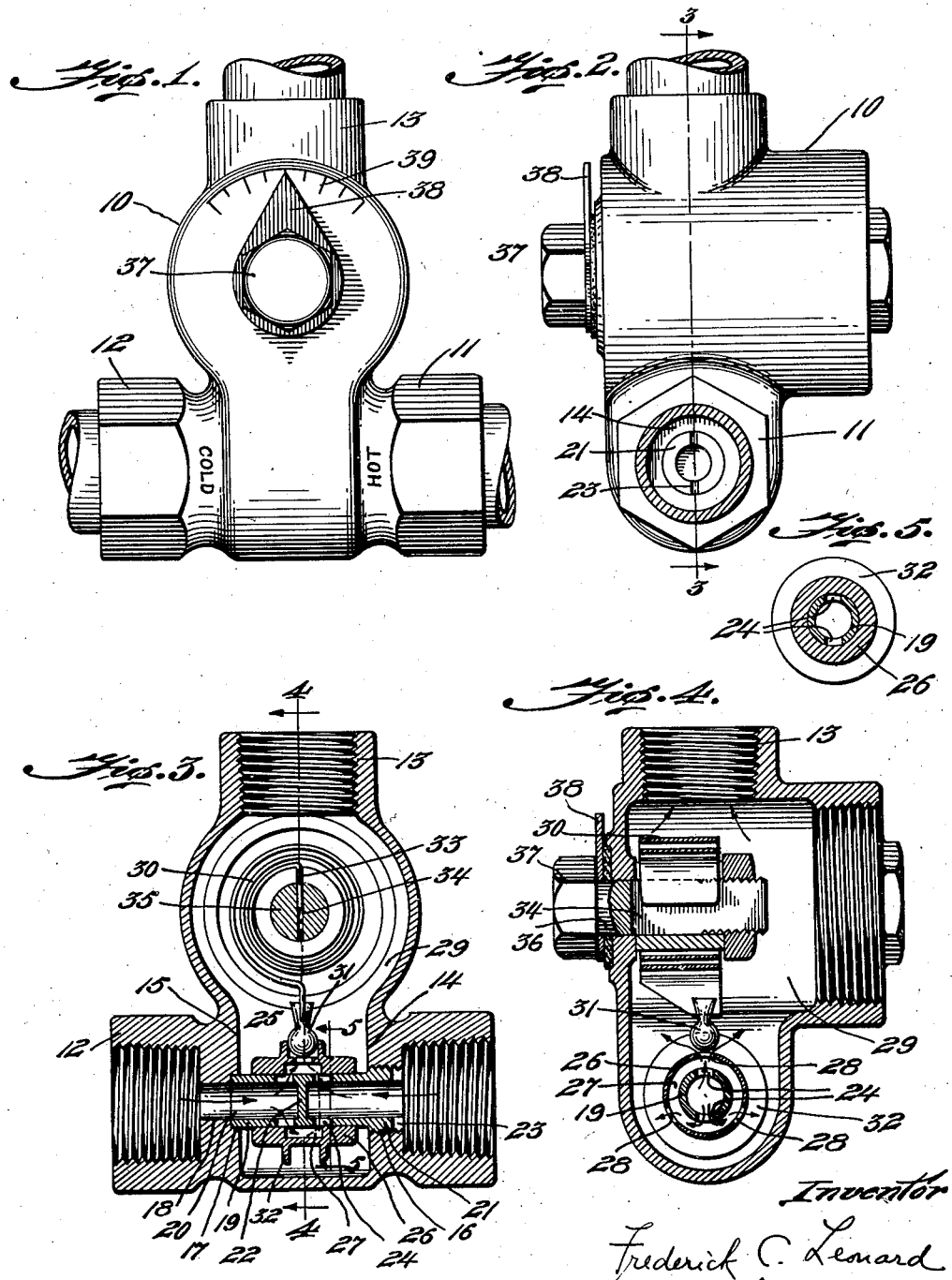

2,175,203

UNITED STATES PATENT OFFICE

2,175,203

THERMOSTATIC MIXER

Frederick C. Leonard, Cranston, R. I.

Application August 17, 1936, Serial No. 96,335

4 Claims. (Cl. 236—12)

My present invention relates to the thermostatic art and has particular reference to a novel thermostatic valve construction which utilizes easily manufactured and assembled parts.

It is the principal object of my invention to devise a thermostatic valve construction using a small number of parts, the total moving parts being two in number, whereby the cost of manufacturing and assembly is greatly reduced, and the price of the valve to the user is greatly lowered.

It is a further object of my invention to provide a novel mixing chamber of annular formation.

It is an additional object of my invention to provide a construction having a balanced valve arrangement.

With the above and other objects and advantageous features in view, my invention consists of a novel arrangement of parts more fully disclosed in the detailed description following, in conjunction with the accompanying drawing, and more specifically defined in the claims appended thereto.

In the drawing:

Fig. 1 is a front elevation of the novel valve showing the setting arrangement;

Fig. 2 is a side elevation thereof;

Fig. 3 is a vertical section thereof on the line 3—3 of Fig. 2 showing the internal construction of the valve and the assembly of the parts;

Fig. 4 is a section on the line 4—4 of Fig. 3; and

Fig. 5 is a detailed section on the line 5—5 of Fig. 3.

Referring to the drawing, the novel valve construction includes a casing 10, preferably of brass, which has secured thereto, or if preferred formed integral therewith, two inlet connections 11 and 12 threaded to receive hot and cold water inlet pipes, and an outlet connection 13 which is threaded to receive a mixed fluid pipe, the inlet connections being in opposed relation. As best shown in Fig. 2, the base of the casing has two side walls 14, 15, the side wall 14 having an internally threaded bore 16 and the side wall 15 being recessed as indicated at 17 and having an opening 18, whereby a cylindrical valve housing 19 of non-corrosive metal may be mounted in the casing with its inner ends 20 seated in the recess 17 and its head end 21, preferably of greater diameter, threaded to seat in the internally threaded bore 16; a central partition 22 is provided in the housing 19 to separate the hot and cold fluid, and the walls of the head end are slotted as at 23 for the engagement of a screwdriver or similar mounting tool. As shown in Figs. 2 and 4, the housing has two diametrically opposite ports 24 on one side of the partition 22 and two aligned diametrically opposite ports 25 on the other side of the partition 22, whereby the incoming hot and cold fluid enters the housing in opposed relation and passes outwardly through the ports 24 and 25. A sliding sleeve valve 26 of non-corrosive metal is mounted to slide on the housing 19, and has an inner annular recess 27 which serves as a mixing chamber, the outer wall of the said recess having a plurality of ports 28; the preferred construction has three such ports spaced at 120°, whereby the hot and cold fluids emerging from the ports 24 and 25 enter into the annular mixing chamber and emerge in mixed condition through the outlet ports 28 to enter the thermostatic chamber 29.

The actuation of this valve in a lateral direction controls the relative amounts of hot and cold fluid admitted to the mixing chamber; this control is effected automatically by means of a thermostatic coil 30, which has its lower end turned to terminate in a ball shaped finger 31 which may be integral therewith or formed separately and secured thereto, the finger being positioned between spaced annular upstanding flanges 32 formed on the exterior surface of the sleeve valve 26, and preferably on each side of the outlet ports 29, whereby the spaced flanges function as an annular outlet guide for the mixed fluid. The inner end 33 of the coil is bent as shown in Fig. 2, and is seated in a radial slot 34 of a control shaft 35, the outer end 36 of the control shaft being reduced in size and threaded as indicated in Fig. 3 to receive an internally threaded nut member 37 to which a pointer element 38 is preferably secured, the pointer element 38 cooperating with graduations 39 on the outer face of the casing 10.

The manufacture and assembly of the novel construction, and the operation of the assembled valve, may now be explained. The valve consists of an outer casing, in which is fixed a cylindrical valve housing, a slide valve of the sleeve type being mounted on the valve housing; an adjustable shaft extends into the casing and has one end of a thermostatic coil secured thereto, the other end of the thermostatic coil being movable in response to changes in temperature of the mixed fluid in the thermostatic chamber for shifting the slide valve so as to control the relative amounts of hot and cold fluid admitted to the mixing chamber, the mixed fluid emerging from the annular mixing chamber through the annularly positioned ports and the annular guide groove into the thermostatic chamber. The mixed fluid fills the thermostatic chamber, thus acting on the thermostatic coil, and outflows through the outflow conduit 13. With the shaft set in the position indicated in Fig. 1, the pointer points at the central graduation, and the thermostatic coil is set for a definte temperature of mixed fluid; any variation in the temperature of the mixed fluid will cause a movement of the thermostatic coil and a lateral shift of the slide valve so as to regulate the volume of hot and cold fluids to again bring the mixed fluid to the desired temperature. If a different mixed fluid temperature is desired, the shaft 35 is rotated by turning the end 37, a slot 40 being provided to facilitate this turning by means of a screwdriver or similar tool, the pointer 38 being shifted to one side or the other so as to correspond with a different graduation 39; the temperature of the mixed fluid is then controlled by the thermostatic coil so as to correspond to this set temperature.

It is thus evident that the apparatus has but two moving parts, namely, the thermostatic coil and the slide valve, and but one adjustable part, namely the shaft 35, whereby the manufacture of the novel thermostatic valve, the assembly thereof, and its adjustment is greatly facilitated.

The use of a slide valve of the type described thus produces a balanced valve arrangement in which the effect of differences in pressure of the hot and cold fluids is minimized; the annular mixing chamber and its spaced ports result in a mixing that is substantially complete, but has sufficient temperature variations to keep the thermostatic coil active, the mixing being finally completed to a uniform temperature in the thermostatic chamber.

While I have described a specific constructional embodiment of my invention, any changes in the size, dimensions, and relative proportions of the various parts, and in their materials, may be made to suit the requirements for different valve installations, without departing from the spirit and the scope of the invention as defined in the appended claims.

I claim:

1. In a valve construction, a casing having a thermostatic chamber, opposed hot fluid and cold fluid inlet openings, and an outlet opening from said thermostatic chamber for mixed fluid, a tubular ported member having a partition and end passageways communicating with said inlet opening and outflow ports, a valve mounted on said member and having a mixing chamber in communication with said outlet ports and movable to simultaneously decrease flow through one outflow port for one fluid and increase flow through the other outflow port for the other fluid, said mixing chamber having a mixed fluid outlet port communicating with said thermostatic chamber, thermostatic means in said thermostatic chamber responsive to variations in temperature of the mixed fluid and operatively connected to said valve, and means for adjustably setting said thermostatic means.

2. In a valve construction, a casing having a thermostatic chamber, opposed hot fluid and cold fluid inlet openings, and an outlet opening from said thermostatic chamber for mixed fluid, a tubular ported member having a partition and end passageways communicating with said inlet openings and outflow ports, a valve slidably mounted on said member and having a mixing chamber in communication with said outlet ports and reciprocatable to simultaneously decrease flow through one outflow port for one fluid and increase flow through the other outflow port for the other fluid, said mixing chamber having a mixed fluid outlet port communicating with said thermostatic chamber, thermostatic means in said thermostatic chamber responsive to variations in temperature of the mixed fluid and operatively connected to said valve for reciprocation thereof in response to changes in temperature of said mixed fluid, and means for adjustably setting said thermostatic means.

3. In a valve construction, a casing having a thermostatic chamber, opposed hot fluid and cold fluid inlet openings, and an outlet opening from said thermostatic chamber for mixed fluid, a cylindrical ported member having a partition and end passageways communicating with said inlet openings and outflow ports, a valve mounted on said member and having an annular mixing chamber in communication with said outlet ports and movable to simultaneously decrease flow through one outflow port for one fluid and increase flow through the other outflow port for the other fluid, said mixing chamber having a mixed fluid outlet port communicating with said thermostatic chamber, thermostatic means in said thermostatic chamber responsive to variations in temperature of the mixed fluid and operatively connected to said valve, and means for adjustably setting said thermostatic means.

4. In a valve construction, a casing having a thermostatic chamber, opposed hot fluid and cold fluid inlet openings, and an outlet opening from said thermostatic chamber for mixed fluid, a cylindrical ported member having a partition and end passageways communicating with said inlet openings and outflow ports, a valve slidably mounted on said member and having an annular mixing chamber in communication with said outlet ports and reciprocatable to simultaneously decrease flow through one outflow port for one fluid and increase flow through the other outflow port for the fluid, said mixing chamber having a mixed fluid outlet port communicating with said thermostatic chamber, thermostatic means in said thermostatic chamber responsive to variations in temperature of the mixed fluid and operatively connected to said valve for reciprocation thereof in response to changes in temperature of said mixed fluid, and means for adjustably setting said thermostatic means.

FREDERICK C. LEONARD.